No. 897,312. PATENTED SEPT. 1, 1908.
E. A. SPERRY.
ELECTRIC LOCOMOTIVE.
APPLICATION FILED FEB. 7, 1908.
2 SHEETS—SHEET 1.
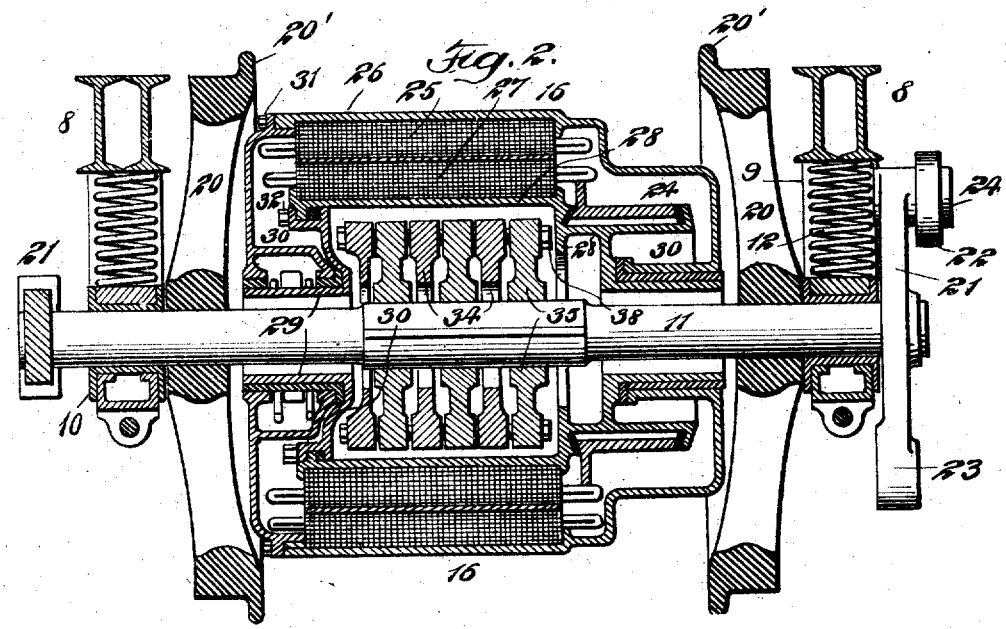
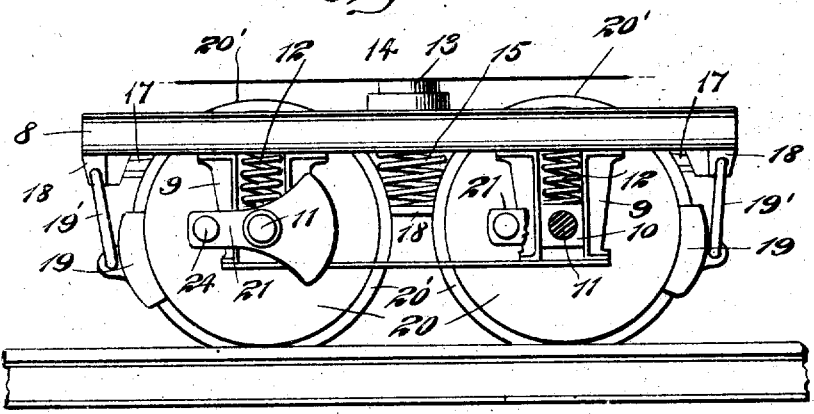
WITNESSES:
INVENTOR
E. A. Sperry.
BY Buckingham & Ewart,
ATTORNEYS No. 897,312. PATENTED SEPT. 1, 1908.
E. A. SPERRY.
ELECTRIC LOCOMOTIVE.
APPLICATION FILED FEB. 7, 1908.
2 SHEETS—SHEET 2.
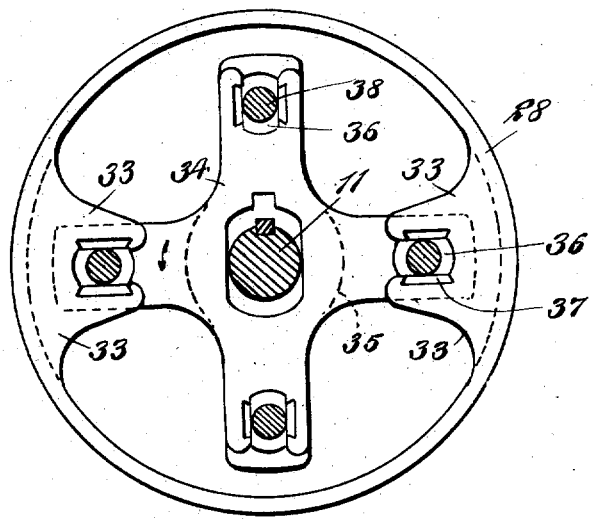
Fig. 3.
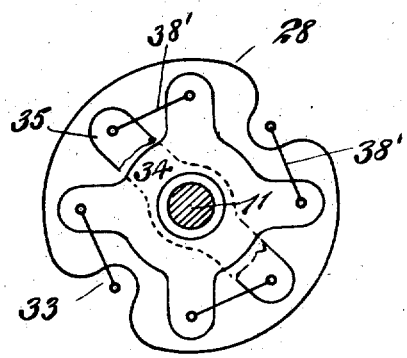
Fig. 4.
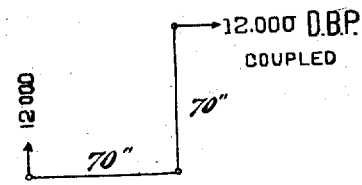
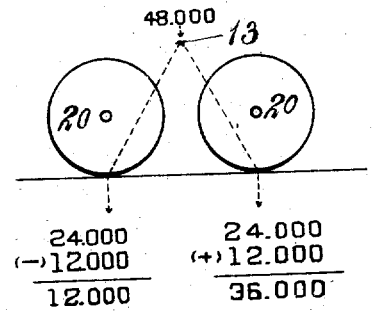
Fig. 5.
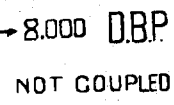
WITNESSES:
INVENTOR
E. A. Sperry,
BY Buckingham &...
ATTORNEYS

UNITED STATES PATENT OFFICE.

ELMER A. SPERRY, OF BROOKLYN, NEW YORK.

ELECTRIC LOCOMOTIVE.

No. 897,312.

Specification of Letters Patent.

Patented Sept. 1, 1908.

Application filed February 7, 1908. Serial No. 414,674.

*To all whom it may concern:*

Be it known that I, ELMER A. SPERRY, a citizen of the United States, residing at Brooklyn, in the county of Kings and State of New York, have invented new and useful Improvements in Electric Locomotives, of which the following is a specification.

My invention relates to electric locomotives and it has for its object to improve the traction conditions of such locomotives.

The invention consists broadly in attaching powerful motors or (and) other torque controlling devices to each of a pair or more axles within a locomotive or locomotive truck, coupling the said locomotive or truck to the load at a point at a considerable elevation above the roadway, and rotatively coupling the various axles for purposes of preventing the unequal rail pressure attending the development of stress within the truck, from cutting down or impairing the tractive effort or useful result of the operation of such locomotive or truck, all of which for purposes of illustration are represented in one form, in the accompanying drawings of which Figure 1 represents a side elevation of a two axle truck which may constitute the locomotive or operate in connection therewith.
Fig. 2 represents a vertical section showing part of the motor traction wheels and truck parts. Fig. 3 is a view of a yielding transmission. Fig. 4 is a diagram of the operation of the device of Fig. 3. Fig. 5 is a diagrammatic representation of the strains, moment of effort, etc. within the locomotive.

It will be readily understood that the locomotive may consist of any number of axles with traction wheels and motors driving each, for instance three or four axles may be used, with motors driving each but according to my invention, they should sustain mechanical power driving connection with such axles for reasons hereinafter stated. The delivery of tractive effort between the truck or locomotive and load may consist in an ordinary draw-head or it may be represented by a bolster or any connection which is sustained between the driving element and the load. For purposes of discussion the rotating portion of the electric motor will be denominated as its armature and the stationary portion as its field, regardless as to the exact electrical, magnetic or technical relation which they may sustain in different types of motor construction.

One object of my invention is to permit of shortening up of the wheel base of the trucks, thereby improving their running factor, especially on curves, in this way grouping the drivers as closely together as is permissible with the proper arrangement of braking appliances inasmuch as the position of the bolster need not necessarily be between the motors but may be above and between same, allowing the motors to come closer together and permitting the swiveling point and traction delivering point of the truck, if need be, to occupy a higher point than heretofore permissible with reference to elevation above the roadbed; also relative (100% or more) to the wheel base of the truck, without sacrifice of the traction qualities of the truck.

An object of my invention is to divide up the motive power and locate a unit upon each axle. The advantage thus gained is well understood, especially in connection with high powers where direct driving is thus secured between the total motive power and each of the axles. Series parallel coupling of the motors with all the attendant advantages is also secured where electric motors are employed, as well as increased radiating surface, especially where overloading becomes necessary. It may be stated in passing, that series parallel control has been found of no avail and has been abandoned in all high power locomotives when developing a high degree of draw-bar-pull, inasmuch as the unbalanced loading of the axles allows one motor to slip before the other or others and when these motors are in series circuit relation, slipping of any one motor, as is well known, paralyzes the system. Where mechanical coupling of the axles exists, slippage of one set of wheels can not take place without the others and the full economies of the series parallel control at once become available.

A truck-frame 8 of ordinary construction may be supplied with the pedestals 9—9 for containing axle journal boxes, for the driving axles 11; the pedestals are suitably attached to the frame and the boxes 10 may sustain the truck frame through the resilient medium or springs 12 which may be of the usual construction. A bolster 13 serves to allow the truck to swivel with regard to the locomotive 14 and may also be used as a point of transmission of traction efforts, either positive or negative. The bolster is preferably a spring supported, as shown in dotted lines by springs 15; motors 16, shown also in dotted lines, are suitably supported within the trucks as by arms 17, also dotted, the mounting being such as to allow of one or more resilient factors, such for instance as the springs 12, to fall between the motor supports and the axles 11. The cross beams 18 serve to illustrate the motor supports. On the truck in Fig. 1 the drivers 20 are shown very close together,—in fact their flanges 20' may come in very close proximity to each other and under my invention the brakes 19 may be applied to the outer faces of the wheels under conditions which are free from the objection of disturbances of the traction factors of the truck heretofore found to this arrangement, as will be fully specified. The brakes may be hung from the truck frame 8 by the usual links 19'—19'. The axles 11 are extended outside of the journals 10 where they are attached to the power driving means for connection of the various axles of the truck or locomotive. The form here adopted to illustrate this feature is the counter-balance cranks 21 and pitman or parallel bar 22, which is well known as the usual type. The counter-balance is shown at 23 and the crank pin at 24, the cranks being set on the quarter at the two ends of the axle, in the well-known manner.

Passing now to Fig. 2 which shows a partial truck and motor section, we see that the axle journals 10 sustained in the truck, are outside of the traction wheels 20, the space between which is practically filled by the motor and that to increase this space, the wheels 6 are dished outwardly at their centers. Let us consider that the motor 16 is of the commutator alternating current type with the commutator at 24, and field 25 within the housing or field frame 26; the armature 27 is mounted upon a hollow shell 28, to which are attached the hollow quill axles 29, located within suitable journals 30, which are formed upon or secured to the main frame of the motor 26 sustaining the field. One journal 30, preferably the rear journal, i. e. the one away from the commutator 24, or both, are detachably secured to the frame 26 as by bolts 31 and one or both of the quills or hollow axles 29 also sustains the detachable connection with the armature shell 28, as by bolts 32. Interior to the hollow armature shell is located the power transmitting device shown in Fig. 3, in which the shell 28 is shown as being supplied at diametrical points with interior projections 33, sustaining power driven connection with a floating transmission member 34 out of contact with axle 11, as shown in Figs. 2 and 3, and which are plural, these being indicated in Fig. 2. Keyed or otherwise attached to axle 11 are the driving connections 35 which also preferably are plural in number. The floating member in the present instance is provided with four arms—two sustaining power driven connection with axle 11 and two with the armature 28, (there being freedom for universal movement) which is secured through the slits shown at the ends of all of the driving members and indicated at 36—36, etc. These slits may have plani-linear lateral wearing faces, as indicated at 37 and are organized to receive power transmitting pins or other equivalent roller-bearing carried in the slots connections indicated at 38—38, etc. in Fig. 3. In this instance it will be seen that the pin or roller bearing 38—38 etc. may be continuous and slip into position as the final act of assembling before the detachable ends of both armature and motor are adjusted. The pins 38—38 etc. are prevented from lateral displacement by suitable abutting plates 28'.

The power connection is illustrated diagrammatically in Fig. 4 by the links 38'. The organization should be such as to permit of relative movement in line of the radius on the quadrature, the power being received and transmitted through the medium of a floating intermediate member, 34. If the strains are traced in their proper relations through this mechanism, it will be discovered that practically only torque efforts are received and transmitted by this peculiar device, between the axle and the motor and although some of the members are plural, it will also be seen at once that the axes may not only be eccentric during the transmission but also may be out of parallelism with each other by virtue of the plural parts, without introducing dragging strains upon the motor journals and while continuing to transmit practically torque effort only.

The journals 30 are provided with the usual oiling device.

The reference characters will serve to indicate similar parts in Fig. 4, which is simply a diagram introduced to aid in the clear understanding of the operation of the device in Figs. 2 and 3. With reference to this figure it will be understood that the arm 35 sustains a rigid attachment to axle 11. Suppose the axle 11 to move up and down with reference to the rest of the figure, the horizontal links 38' swinging at their ends would allow of this movement. Suppose now, we should move the axle 11 laterally or upon a horizontal line, the horizontal links just referred to being rigid, the floating transmission member, 34 would partake of this lateral motion, vibrating upon the vertical links 38' and any diagonal motion or motion at an angle on the part of axle 11 would introduce swinging motion of both pairs of vertical and horizontal links 38', as will be readily understood.

Passing now to the diagram expressing the quantitative relations between strains and weights in a specific example illustrating the nature of my invention, it should be stated that it is usual to independently drive motor axles and this heretofore has been accomplished by motors which have been resiliently supported but in these instances usually resilient driving devices have been employed and when the entire space between the drivers has been utilized, the responsibility of the locomotive designer has been heretofore looked upon as fulfilled. An examination of the strains present, however, will indicate that an additional factor is necessary for the complete realization of anywhere near all the tractive effort of which the locomotive is capable. The drivers 20—20 are shown in their relation upon the 70" wheel base where the bolster 13 is also 70" from the track as indicated by the bell crank lever immediately above, the tractive effort resulting in drawbar pull always being in a horizontal line and parallel with the truck. For purposes of illustration a 25% tractive co-efficient will be assumed with the drivers sustaining a weight of 48,000 lbs. for the development of 12,000 lbs. draw-bar pull. The two lever arms shown in the upper part of the figure being equal, the forward drivers will be lifted from the track to the extent of the drawbar pull, viz: 12,000 lbs. but this driver originally sustains 24,000 lbs. leaving a difference of only 12,000 lbs. pressure between it and the rail for development of this tractive effort. The total weight not being altered in any way, the rear drivers will be compelled to assume the difference or 12,000 lbs., making a total pressure on these drivers of their sum, (24,000 plus 12,000) or 36,000 lbs. With these factors in mind, let us now examine the tractive efforts, either positive or negative, of such a truck or locomotive under conditions, first of coupled drivers and then with drivers uncoupled, assuming for this purpose that the motor 16 upon each of the axles, or brake system 19, is sufficient to slip the drivers under conditions of normal sanding which may at times develop as high as 33% tractive co-efficient. With the coupled drivers, all the motive power available in the two axles, is at once delivered as drawbar pull because of two factors, first, the total tractive effort upon the two drivers, though shifted and very greatly disturbed as to distribution,—is still equal as to total amount and secondly, that although the forward motor would easily slip the forward driver, yet the power driving connections not only deliver such of its power as is not required through its own lessened adhesion at once to the rear drivers, the adhesion of which has been augmented, but the front drivers are not permitted to lose such adhesion but are held strictly in step with the rear drivers, thus securing all the advantages of the total power though it is divided and applied to each axle. This is not true where the drivers are not coupled, as has been repeatedly demonstrated in practice, inasmuch as through the lifting effect of the forward drivers—plainly indicated in the diagram— these drivers lose their adhesion, slipping continue to spin, and the total tractive effort or draw-bar pull developed by the locomotive as a whole, devolves upon the rear axle only, which as is well known, commands only one motor or ½ of the total motive power of the locomotive or truck, because the co-efficient of friction of the slipping drivers is known to be only about ⅛ to ¼ of the normal adhesion of the non-slipping driver under similar pressure conditions. For this reason it is at once seen that the forward pair of drivers may be almost wholly excluded so far as their contribution to the total tractive effort is concerned. In practice it has been ascertained that a two axle locomotive under the conditions of the diagram Fig. 5 will give not far from 8000 lbs. drawbar pull as indicated in the lower part of the diagram. Comparing the figures with those at the top of the diagram the marked advantage of coupled drivers becomes apparent. Furthermore, the fact must not be lost sight of that the advantages just stated apply equally well to the braking qualities of these trucks or locomotives, or their capacity to absorb energy from their load, as it does to their positive tractive effort discussed above, in imparting energy thereto.

Having fully described my invention and pointed out its use and operation, I may state that the invention is not limited to any particular style of motor or even to an electric motor. The motor may be mounted directly upon the axle and a number of modifications may be made without departing from the spirit of the invention.

I claim:

1. In a locomotive, a plurality of wheeled driving axles for developing the tractive effort, divided motive power consisting of a motor, for each axle, a truck-frame holding the motors, provided with means at considerable elevation from the roadway, for delivering the effort thus developed to the load and means for rotatively coupling the axles.

2. In a locomotive, a plurality of wheeled driving axles for developing the tractive effort, divided motive power consisting of a motor, for each axle, retarding means for each axle, a truck-frame holding the motors and retarding means, provided with means at considerable elevation from the roadway for delivering the effort thus developed to the load, and means for rotatively coupling the axles.

3. In a locomotive, a plurality of wheeled driving axles for developing the tractive effort, divided motive power consisting of a motor, for each axle, a truck-frame holding the motors, providing journals for the axles outside the wheels, and also provided with means at considerable elevation from the roadway, for delivering the effort thus developed to the load and means for rotatively coupling the axles located outside the truck-frame.

4. In a locomotive, a plurality of wheeled driving axles in close relation, for developing the tractive effort, divided motive power consisting of a motor, for each axle, practically filling the space between the wheels, a truck-frame holding the motors, provided with means at considerable elevation from the roadway, for delivering the effort thus developed to the load and means for rotatively coupling the axles.

5. In a two axled locomotive truck, the axles being in close relation for developing the tractive effort, divided motive power consisting of a motor, for each axle, a truck frame holding the motors provided with a swiveling bolster at a considerable elevation from the roadway for supporting the load and means for rotatively coupling the axles.

6. In an electric locomotive a plurality of driving axles, traction wheels mounted upon such axles, a truck frame, a traction connection between the frame and the load located at considerable height above the road bed, journals between the truck frame and axles located outside the traction wheels electric motors surrounding and directly driving the axles a motor journal bearing, motor parts overhanging such journal the motors occupying practically the entire space between each of the traction wheels and power driving connections between the several axles.

7. In an electric locomotive a plurality of driving axles, traction wheels mounted upon such axles, a truck frame, a traction connection between the frame and the load located at considerable height above the road bed, journals between the truck frame and axles located outside the traction wheels, resiliently mounted electric motors with quill armature journals surrounding, but out of contact with the axles, each of such journals being interior to the motor, such motors occupying practically the entire space between each of the driving wheels, a yielding power driving connection between the armature and the axles and independent power driving connections between the several axles.

8. In a locomotive a two axle truck, traction wheels mounted upon each of the axles, a truck frame, a swiveling bolster between the truck and the locomotive located between the axles and at a considerable height above the road bed relatively to the wheel base of the truck, a resilient factor within the truck, located between the axles and the bolster, axle journals in the truck frame outside the traction wheels, electric motors driving each of the axles and occupying practically the entire space between the traction wheels upon each of the axles a resilient factor between the motor and the axle, a power driving connection from the motor to the axle, independent of the said factor and power driving connections between the axles.

9. In a locomotive a two axle truck, traction wheels mounted upon each of the axles, a truck frame, a swiveling bolster between the truck and the locomotive located between the axles and at a considerable height above the road bed relatively to the wheel base of the truck, a resilient factor within the truck, located between the axles and the bolster, axle journals in the truck frame outside the traction wheels, springs between the journals and the truck, electric motors driving each of the axles and occupying practically the entire space between the traction wheels upon each of the axles a resilient factor between the motor and the axle, a power driving connection from the motor to the axle, independent of the said factor and power driving connections between the axles.

10. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle and a yielding but non-resilient power driving connection between the motor and the axle.

11. An electric locomotive comprising an axle, traction wheels upon the axle, with outwardly dished centers forming convex cavities, an electric motor practically filling the entire space between the drivers including the convex cavities, journals for the axle outside the traction wheels, a quill mounting for the motor armature surrounding but out of contact with the axle, a resilient support for the motor located between the motor and the axle and a yielding but non-resilient power driving connection between the motor and the axle.

12. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle and a yielding power driving connection between the motor and the locomotive axle.

13. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, a hollow armature shell for the motor and a yielding power driving connection between the motor and the axle, located within the shell.

14. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising an intermediate floating member suitably connected to both motor and axle.

15. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising a quadrangular intermediate floating member suitably connected to both motor and axle.

16. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising an intermediate floating member suitably connected to both motor and axle, and roller bearings for connecting the said transmission member to the driving parts.

17. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising a plurality of intermediate floating members suitably connected to both motor and axle.

18. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising a plurality of intermediate floating members suitably connected to both motor and axle and a continuous roller bearing engaging the plural floating members for connecting same to the driving parts.

19. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising an intermediate floating member suitably connected to both motor and axle, and roller bearings for connecting the said transmission member to the driving parts, and wearing pieces presenting surfaces for the roller bearing forming a part of such transmission.

20. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, a power driving connection between the motor and the axle, organized to permit radial displacement of such axle with reference to the motor and a removable quill journal for the motor.

21. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, a power driving connection between the motor and the axle, organized to permit radial displacement of such axle with reference to the motor and a removable portion of the armature shell carrying the motor axle for the motor.

22. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, a power driving connection between the motor and the axle, organized to permit radial displacement of such axle with reference to the motor, a removable end frame for the motor field, and a journal mounted upon such movable frame.

23. An electric locomotive comprising an axle, traction wheels upon the axle, an electric motor between the traction wheels, journals for the axle outside the traction wheels, a quill mounting for the motor armature surrounding but out of contact with the axle, a resilient support for the motor located between the motor and the axle, and a power driving connection between the motor and the axle, comprising a plurality of intermediate floating members suitably connected to both motor and axle, roller bearing engaging the plural floating members for connecting same to the driving parts, and end abutments suitably located for preventing longitudinal displacement of the roller bearings.

In testimony whereof I have hereunto set my hand in presence of two subscribing witnesses.

ELMER A. SPERRY.

Witnesses:
A. MATTULLATH,
A. H. McKINLAY.